United States Patent
Lee et al.

[11] Patent Number: 6,114,431
[45] Date of Patent: Sep. 5, 2000

[54] PLASTIC COMPOSITION

[75] Inventors: Victor Lee, New Philadelphia; Ed Wykoff, Massillon, both of Ohio; Mark A. Crawford, Valdosta, Ga.

[73] Assignees: Griffin Corp., Valdosta, Ga.; ICC Industries, New York, N.Y.

[21] Appl. No.: 08/965,970

[22] Filed: Nov. 7, 1997

Related U.S. Application Data

[60] Provisional application No. 60/030,765, Nov. 8, 1996.

[51] Int. Cl.[7] ................ C08J 5/10; C08K 3/10; C08L 33/06
[52] U.S. Cl. .................. 524/435; 524/440; 524/47; 524/322
[58] Field of Search ................... 524/425, 440, 524/435, 423, 431, 13, 15, 16, 47, 322, 451, 449, 35; 523/123

[56] References Cited

U.S. PATENT DOCUMENTS

| | | | |
|---|---|---|---|
| 2,202,664 | 5/1940 | Leatherman | 47/37 |
| 3,842,537 | 10/1974 | Bishop | 47/37 |
| 3,844,987 | 10/1974 | Clendinning et al. | 260/7.5 |
| 3,850,862 | 11/1974 | Clendinning et al. | 260/7.5 |
| 3,852,913 | 12/1974 | Clendinning et al. | 47/37 |
| 3,867,324 | 2/1975 | Clendinning et al. | 260/23 H |
| 3,901,838 | 8/1975 | Clendinning et al. | 260/23 H |
| 3,919,163 | 11/1975 | Clendinning et al. | 260/40 R |
| 3,921,333 | 11/1975 | Clendinning et al. | 47/37 |
| 3,923,729 | 12/1975 | Clendinning et al. | 260/40 R |
| 3,929,937 | 12/1975 | Clendinning et al. | 260/896 |
| 3,932,319 | 1/1976 | Clendinning et al. | 260/7.5 |
| 3,967,921 | 7/1976 | Haberli et al. | 8/93 |
| 4,604,525 | 8/1986 | Kitada et al. | 250/363 R |
| 4,902,815 | 2/1990 | Motegi et al. | 560/45 |
| 4,966,910 | 10/1990 | Lai et al. | 514/383 |
| 5,180,575 | 1/1993 | Ha et al. | 404/49 |
| 5,213,857 | 5/1993 | Erkkilä | 428/34.1 |
| 5,389,137 | 2/1995 | Linde et al. | 106/281.1 |
| 5,575,112 | 11/1996 | Scheubel | 47/78 |
| 5,830,937 | 11/1998 | Shalov et al. | 524/297 |

*Primary Examiner*—James J. Seidleck
*Assistant Examiner*—U. K. Rajguru
*Attorney, Agent, or Firm*—Oldham & Oldham Co., LPA

[57] ABSTRACT

A plastic composition having incorporated copper is provided in accordance with the invention. The plastic material can be processed at low temperatures, readily absorbs water, and has good film forming properties. In particular, the plastic material is a polycaprolactone and the copper is derived from copper hydroxide and/or copper carbonate. The plastic material is useful for forming plant containers that promote a branched root structure.

44 Claims, No Drawings

PLASTIC COMPOSITION

This appln. claims benefit of provisional Appln. No. 60/030,765 Nov. 8, 1996.

FIELD OF THE INVENTION

This invention relates generally to plastic compositions and, in particular, to a copper-containing plastic composition.

BACKGROUND OF THE INVENTION

Plants with dense, branched root systems are generally stronger, healthier, and better able to survive transplantation than plants that do not have such dense, branched root systems. However, the roots of plants grown in containers tend to grow in a straight line, without branching, and the roots develop a characteristic container-circling structure as they fill the container.

Plants with container-circling root structures are not well suited to successfully survive transplantation because the roots generally continue to grow in a restricting line pattern once the circling growth pattern is established. As a result, the root system does not grow outward from the containerized root system to properly anchor the plant and the plant does not then seek nutrition and moisture from a large enough area to support itself as it grows.

Furthermore, plants having this type of circling root structure are not readily transported because the portion of the root that is in contact with the container is exposed to the high temperatures that such containers, which are generally formed of a black plastic, will reach in the sun. These high temperatures are damaging to the roots, which have limited recuperative powers due to the lack of branching.

It is known that certain copper chemicals will terminate a root's growth on contact, thereby causing the root to branch in a manner similar to that in which the trimming of a tree causes a single branch to become many branches. This is desirable in the plant nursery trade as a plant grown in a container having these type of copper chemicals will have a dense, branched root ball or system. Such a dense, branched root ball will result in a stronger, healthier plant that is better able to survive transplantation.

It is difficult to provide a plastic composition having copper available to control root growth. Typical thermoplastic compositions encapsulate the copper so completely that the roots do not recognize that the copper is available and, therefore, do not branch. Additionally, copper chemicals cause plastic to degrade at typical processing conditions of greater than about 350° F. Furthermore, the copper itself changes to a form that is less effective for establishing root branching at the typical processing temperatures.

It would, therefore, be desirable to provide a plastic composition having incorporated copper that can be used to manufacture plant containers that regulate the growth of plant roots.

It is an object of the invention to provide a plastic composition having incorporated copper.

It is a further object of the invention to provide a plastic composition having incorporated copper that can be used to manufacture plant containers.

It is another object of the invention to provide a plastic composition having incorporated copper that can be used to manufacture plant containers that can be used to regulate the growth of plant roots.

Still other objects and advantages of the invention will in part be obvious and will in part be apparent from the specification.

SUMMARY OF THE INVENTION

Generally speaking, a plastic composition having incorporated copper is provided in accordance with the invention. The plastic material can be processed at low temperatures, readily absorbs water, and has good film forming properties. In particular, the plastic material is a polycaprolactone and the copper is derived from copper hydroxide and/or copper carbonate. The plastic material is useful for forming plant containers that promote a branched root structure.

The invention accordingly comprises a composition of matter possessing the characteristics, properties, and the relation of constituents which will be exemplified in the composition hereinafter described, and the scope of the invention will be indicated in the claims.

DETAILED DESCRIPTION OF THE PREFERRED EMBODIMENTS

A plastic composition having incorporated copper is provided in accordance with the invention. The plastic composition includes a primary polymer and, optionally, a secondary polymer.

The primary polymer can be processed at a temperature that is low enough to prevent heat degradation of the polymer due to the presence of copper. In particular, suitable polymeric materials can be processed at temperatures less than about 320° F., and preferably between about 270° and 295° F.

In addition, the primary polymeric material should readily absorb water or be partially water soluble. This property permits the incorporated copper to be released from the plastic composition. Accordingly, plant roots become aware of the presence of the copper and react by branching.

Finally, suitable primary polymers must be good film formers. This provides physical properties that make the copper-incorporated plastic provided in accordance with the invention useful as plant containers.

Suitable primary polymeric materials include, but are not limited to, polycaprolactone polymers. One particularly suitable polycaprolactone polymer is available from Union Carbide of Danbury, Conn. under the tradename TONE. Varying molecular weight polyeaprolactones are designated by tradenames such as TONE 767, TONE 787, and the like.

The molecular weight of the polycaprolactone determines the root control effectiveness of the plastic composition. In general, root control effectiveness increases as molecular weight decreases. This is due to the fact that high molecular weight polycaprolactones have a low flow rate, while low molecular weight polycaprolactones have a high flow rate. Mixtures of high and low molecular weight polycaprolactones can be used to provide a desired flow rate. For example, a product with a high flow rate can be formed by injection molding, whereas a product with a low flow rate can be formed by extrusion or blow molding.

The primary polymeric material is used in an amount between about 20 and 85% by weight of the copper-incorporated plastic composition, preferably in an amount between about 60 and 82% by weight of the composition, and more preferably in an amount between about 68 and 72% by weight.

Optionally, a secondary polymer is used in addition to the primary polymer. The secondary polymer, is used for the purpose of modifying the product's physical characteristics such as stiffness and heat distortion. In addition, the secondary polymer may be used for the purpose of cost reduction.

Suitable secondary polymers include, but are not limited to, ethylene methyl acrylate, metalocene type low density polyethylene, and the like. In particular, ethylene methyl acrylate is available from Millennium Petrochemicals, Inc. of Cincinnati, Ohio under the tradename ACRYTHENE EM802-120 metalocene type low density polyethylene is available from Dow-DuPont Elastomers of Wilmington, Del. under the tradename ENGAGE 8400. When used, the secondary polymer is present in an amount between about 1 and 50% by weight of the plastic composition, preferably in an amount between about 5 and 20% by weight.

Alternatively, vegetable fiber can be used in place of a portion of the polycaprolactone primary polymer to reduce cost, increase stiffness, and improve dimensional stability. An exemplary vegetable fiber is wood flour or wood powder such as pine wood flour, which is available from American Wood Fibers of Schofield, Wis. under the tradename 4020. In addition, the vegetable fiber may replace the starch and/or lignin as well.

The copper can be provided in the form of a water-insoluble copper salt. Suitable copper salts include, but are not limited to, copper carbonate, copper hydroxide, copper oxychloride, basic copper sulfate, cuprous oxide, and mixtures thereof. In a preferred embodiment, copper carbonate is used because it exhibits good thermal stability. The copper is used in an amount between about 2 and 15% by weight of the plastic composition, preferably in an amount between about 5 and 8% by weight.

Other metals may be used in addition to the copper. Such metal salts include, but are not limited to, iron, magnesium, calcium, manganese, zinc, and mixtures thereof. These metal salts may be used to buffer the toxicity of the copper and provide a more robust plant. When used, such metals are present in a total amount of between about 1 and 5% by weight of the plastic composition.

The composition also contains an absorptive material for the purpose of increasing the water absorptivity of the plastic. In one embodiment, the absorptive material is a starch, which can be derived from any source including, but not limited to, corn, potatoes, rice, other starchy vegetables, and mixtures thereof. The starch is used in an amount between about 10 and 40% by weight of the plastic composition, preferably in an amount between about 12 and 18% by weight.

Alternatively, the absorptive material can be a water soluble or partially soluble resin. One exemplary resin is hydroxypropylcellulose, which is available from the Aqualon division of Hercules, Inc. of Wilmington, Del. under the tradename KLUCEL EEL. Alternatively, vegetable fiber can be used as the absorptive material.

Another exemplary absorptive material is a lignin compound formed from plant fibers. One suitable lignin compound is ammonium lignosulphonate, which is available from Lignotech USA of Bridgewater, N.J. under the tradename WANIN AM. The advantage of using ammonium lignosulphonate to replace the starch is that the plastic film that is obtained is smoother and easier to process. Vegetable fiber like wood flour or wood powder such as pine wood flour can also be used.

The plastic composition provided in accordance with the invention also includes a surfactant. The surfactant is useful for increasing the water affinity of the composition. This accelerates the rate at which water is attracted to or picked up by the plastic composition. As a result, the rate at which the copper is released to a plant's roots is increased and consequently, its effectiveness as a root control agent is also increased.

Suitable surfactants are generally nonionic and include, but are not limited to, polyoxyethylene stearic acid, high molecular weight glycols such as polyethylene or polypropylene glycol, poly(oxy-1,2-Ethanediyl)-α-(1-oxooctadecyl)-ω-hydroxy, and mixtures thereof. In a preferred embodiment, polyoxyethylene stearic acid is used. One particularly preferred polyoxyethylene stearic acid is available from Chemax, Inc. of Greenville, S.C. under the tradename E-1750MS/FLK. A particularly preferred poly (oxy-1,2-Ethanediyl)-α-(1-oxooctadecyl)-ω-hydroxy is also available from Chemax under the tradename E-1750MS.

The surfactant is used in an amount between about 0.5 and 5% by weight of the plastic composition, preferably in an amount between about 0.5 and 3% by weight.

Mineral fillers may optionally be used in the copper-incorporated plastic composition provided in accordance with the invention for the purpose of increasing stiffness and heat distortion and reducing cost. Suitable mineral fillers include, but are not limited to, talc, calcium carbonate, magnesium carbonate, mica, and mixtures thereof. When used, such fillers are present in amounts between about 5 and 50% by weight, preferably between about 5 and 15%.

Melt viscosity depressants may also be used in the composition to reduce frictional heating during processing. Such depressants are used for the purpose of keeping the processing temperature low enough to assure processability of the plastic composition without polymer degradation. Suitable melt viscosity depressants include, but are not limited to, mineral oil and are used in an amount between about 0.5 and 10% by weight of the composition, preferably in an amount between about 0.5 and 3% by weight.

The plastic composition with incorporated copper is prepared by preblending all of the components to form a homogeneous mixture. This can be done, for example, in a Hobart mixer.

The homogeneous mixture is then charged to a device to fuse the polymers and provide further mixing. This device can be an extruder, a Farrel continuous mixer, a Banbury mixer, a two roll open mill, or other device that will heat the polymeric material to its fusion point. If the device is an extruder, it may be a single screw or twin screw extruder of the counter or corotating variety.

It is important that the process of fusing the polymers be accomplished at as low a temperature as possible in order to prevent degradation of the polymeric material by the incorporated copper. In general, the temperature of the melt must be maintained below about 320° F.

The fusion process can be used to produce a pellet that can be further processed into a final shape such as an article, sheet, or film. Alternatively, the fusion process can be used to directly prepare the final product with fusion, mixing, and forming all accomplished in one operation.

It is preferable to accomplish the mixing in two stages to maximize uniformity and minimize polymer degradation. When this is done, the polymers and starch are mixed and melted first and then the biological or copper-containing package is added in a second stage or mix. This can be accomplished either by using two passes through a hot mixer or by charging the mixer in two stages so that the polymer mixing and melting occurs prior to addition of the copper system.

As can be seen, many of the ingredients in the copper-containing plastic composition provided in accordance with the invention contain water. This water must be allowed to escape during processing and the processing must be accomplished so that the liberated water is not reabsorbed. This release of water can occur naturally in a Banbury or open mill mixer where volatiles are not restrained.

In processes such as extrusion compounding, water release can be accomplished using a two stage screw having a vented decompression zone after the first stage mixing and melting section. This vent zone is preferably under vacuum to provide the most efficient dewatering possible.

Furthermore, it is preferable to cool the hot product prior to pelletizing in chilled air or against a chilled surface rather than in a water bath or water spray. Most preferably, the dry pellet should be packaged in containers that are made from low water vapor transmission materials such as aluminum foil coated plastic or sealed metal drums.

Attempts to process product pellet which has reabsorbed water will result in a porous article caused by the transformation of trapped water into steam during processing. However, even wet product may be processed successfully by redrying the pellet in a desiccant type drier at 120° F. for at least 2 hours. Drying may not be necessary if a two stage vacuum vented extruder is employed or processing is done in by an open process such as calendering product fluxed in a Banbury mixer.

The plastic composition provided in accordance with the invention can be used to manufacture plant containers. For example, if the plastic composition is provided in the form of a film obtained by extrusion, blown film techniques, or calendaring, the film can be fabricated into a plant container by processes including folding and/or adhering using sewing, adhesive, or heat seal techniques. Alternatively, the film can be laminated onto another carrier plastic by heat bonding or adhesive means and then stamped or thermoformed to make the final plant container.

In still further alternate configurations, plant containers can be manufactured from the plastic composition provided in accordance with the invention by stamping, thermoforming, or fabrication from cut shapes that are bonded together. Plant containers can also be prepared from the copper-incorporated plastic composition by injection molding or blow molding.

The plant containers prepared from the copper-containing plastic composition provided in accordance with the invention are evaluated for their ability to affect root growth by planting seeds in a growing medium contained in the containers. Control seeds are grown in similar plant containers made from plastic materials that do not include incorporated copper. After the plants have grown for a predetermined period of time, the root systems are evaluated and the degree of branching or control is observed. The root systems of the plants grown in the copper-containing plant containers will exhibit a degree of control of greater than about 60%, which is considered to be significant; the root systems of the control plants will exhibit a degree of control of less than 60%.

The following Examples are provided for purposes of illustration only and are not to be construed in a limiting sense.

EXAMPLE 1

Eighty-one (81) parts by weight TONE polycaprolactone polymer, 5 parts by weight copper carbonate, 12 parts by weight corn starch, and 2 parts by weight E-1750MS/FLK polyoxyethylene stearic acid were preblended in a Hobart mixer to produce a homogeneous mixture. The mixture was charged to a Banbury mixer with a room temperature jacket and rotors to fuse the polycaprolactone polymer.

EXAMPLE 2

Seventy-two and two-tenths parts by weight (72.2%) TONE 787 polycaprolactone polymer, 16% by weight KLUCEL EEL hydroxypropylcellulose, 7% copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into sheets. The sheets were folded into a container and corn seedlings were planted in the container. The container was 60% effective in terminating root growth of the corn seedlings when the roots of the corn seedlings came into contact with the container material.

EXAMPLE 3

Seventy-two and two-tenths parts by weight (72.2%) TONE 767 polycaprolactone polymer, 16% by weight corn starch, 7% copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film sheets using a single screw extruder. The melt flow of this formulation was 8.5 grams per 10 minutes at 125° C. and 2.16 kg. The film sheets were folded into a container and corn seedlings were planted in the container. The container was 77% effective in terminating root growth of the corn seedlings when the roots of the corn seedlings came into contact with the container.

EXAMPLE 4

Thirty-six and one-tenth parts by weight (36.1%)TONE 767 polycaprolactone polymer, 36.1% by weight TONE 787 polycaprolactone polymer, 16% by weight corn starch, 7% copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film sheets using a single screw extruder. The melt flow of this formulation was 1.4 grams per 10 minutes at 125° C. and 2.16 kg. The film sheets were folded into a container and corn seedlings were planted in the container. The container was 77% effective in terminating root growth of the corn seedlings when the roots of the corn seedlings came into contact with the container.

EXAMPLE 5

Eighty-three parts by weight (83%) Millennium ACRYTHENE EM802-120 ethylene methyl acrylate polymer, 12% by weight corn starch, 3% by weight copper carbonate, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 50% effective in terminating root growth of the corn seedlings when the roots of the corn seedlings came into contact with the container.

EXAMPLE 6

Fifty-two and two-tenths parts by weight (52.2%) TONE 787 polycaprolactone polymer, 20% by weight Millennium ACRYTHENE EM802-120 ethylene methyl acrylate polymer, 16% by weight corn starch, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 77% effective in terminating root growth of the corn seedlings when the roots of the corn seedlings came into contact with the container.

EXAMPLE 7

Fifty-seven and two-tenths parts by weight (57.2%) TONE 787 polycaprolactone polymer, 15% by weight ENGAGE 8400 low density polyethylene, 16% by weight corn starch, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 83% effective in terminating root growth of the corn seedlings when the roots of the corn seedlings came into contact with the container.

EXAMPLE 8

Sixty-two and two-tenths parts by weight (62.2%) TONE 787 polycaprolactone polymer, 16% by weight corn starch, 10% by weight talc, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 70% effective in terminating root growth of the corn seedlings when the roots of the corn seedlings came into contact with the container.

EXAMPLE 9

Fifty-two and two-tenths parts by weight (52.2%) TONE 787 polycaprolactone polymer, 16% by weight corn starch, 20% by weight American Wood Fibers 4020 pine wood flour, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 80% effective in terminating root growth of the corn seedlings when the roots of the corn seedlings came into contact with the container.

EXAMPLE 10

Eighty-five parts by weight (85%) Millennium ACRYTHENE EM802-120 ethylene methyl acrylate polymer, 12% by weight corn starch, and 3% by weight copper carbonate were melt blended in a Banbury internal mixer, granulated, and extruded into film using a single screw extruder. The film was folded into a container and corn seedlings were planted in the container. The container was 30% effective in terminating root growth of the corn seedlings when the roots of the corn seedlings came into contact with the container.

EXAMPLE 11

Seventy-two and two-tenths parts by weight (72.2%) TONE 787 polycaprolactone polymer, 16% by weight corn starch, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The melt flow for this formulation was 0.8 grams per 10 minutes at 125° C. and 2.16 kg. The film was folded into a container and corn seedlings were planted in the container. The container was 45% effective in terminating root growth of the corn seedlings when the roots of the corn seedlings came into contact with the container.

EXAMPLE 12

Sixty-eight parts by weight (68%) polycaprolactone polymer, 20% by weight wood powder, 7% by weight copper carbonate, 2% by weight magnesium carbonate, 0.8% by weight iron oxide, and 2% by weight CHEMAX E 1750MS poly(oxy-1,2-Ethanediyl)-α-(1-oxooctacecyl)-ω-hydroxy surfactant were melt blended in a Banbury internal mixer, granulated, and extruded into film using a single screw extruder. The film was folded into a container and corn seedlings were planted in the container. The container was 60% effective in terminating root growth of the corn seedlings when the roots of the corn seedlings came into contact with the container.

It can be seen that useful plastic compositions having incorporated copper are provided in accordance with the invention. The compositions can be processed at temperatures less that about 320° F. and attract water readily. Accordingly, the copper is available to control root growth of plants planted in containers manufactured from these copper-incorporated plastic compositions.

It will thus be seen that the objects set forth above, among those made apparent from the preceding description, are efficiently attained and, since certain changes may be made in the above composition without departing from the spirit and scope of the invention, it is intended that all matter contained in the above description shall be interpreted as illustrative and not in a limiting sense.

It is also understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to included compatible mixtures of such ingredients wherever the sense permits.

What is claimed is:

1. A copper-incorporated plastic composition comprising:
   between about 20 and 85% by weight of a primary polymer that is a good film former and that can be processed at a temperature less than about 320° F.;
   between about 3 and about 15% by weight, as copper, of at least one water-insoluble copper salt; and
   said water-insoluble copper salt being incorporated into said primary polymer.

2. The copper-incorporated plastic composition of claim 1 wherein the primary polymer readily absorbs water or is partially water soluble.

3. The copper-incorporated plastic composition of claim 1 wherein the primary polymer is selected from the group consisting of polycaprolactones and ethylene methyl acrylate.

4. The copper-incorporated plastic composition of claim 1 wherein the composition further comprises a secondary polymer for the purpose of modifying the physical characteristics of the plastic composition.

5. The copper-incorporated plastic composition of claim 1 wherein the composition further comprises a secondary polymer selected from the group consisting of ethylene methyl acrylate, low density polyethylene, and mixtures thereof.

6. The copper-incorporated plastic composition of claim 1 wherein the composition further comprises a vegetable fiber.

7. The copper-incorporated plastic composition of claim 1 wherein the water-insoluble copper salt is selected from the group consisting of copper carbonate, copper hydroxide, copper oxychloride, basic copper sulfate, cuprous oxide, and mixtures thereof.

8. The copper-incorporated plastic composition of claim 1 wherein the water-insoluble copper salt is copper carbonate.

9. The copper-incorporated plastic composition of claim 1 wherein the composition further comprises between about 1 and 5% by weight as metal, of a metal salt wherein the metal is selected from the group consisting of iron, magnesium, calcium, manganese, zinc, and mixtures thereof.

10. The copper-incorporated plastic composition of claim 1 wherein the absorptive material is selected from the group consisting of corn starch, potato starch, rice starch, hydroxyproplycellulose, lignosulphonates, and mixtures thereof.

11. The copper-incorporated plastic composition of claim 1 wherein the absorptive material is starch.

12. The copper-incorporated plastic composition of claim 1 wherein the composition further comprises between about 0.5 and 5% by weight of a surfactant selected from the group consisting of polyoxyethylene stearic acid, high molecular weight glycols polyethylene glycol, high molecular weight polypropylene glycol, poly(oxy-1,2-Ethanediyl)-α-(1-oxooctadecyl)-ω-hydroxy, and mixtures thereof.

13. The copper-incorporated plastic composition of claim 12 wherein the surfactant is polyethylene stearic acid.

14. The copper-incorporated plastic composition of claim 1 wherein the composition further comprises between about 5 and 50% by weight of a mineral filler selected from the group consisting of talc, calcium carbonate, magnesium carbonate, mica, and mixtures thereof.

15. The copper incorporated plastic composition of claim 1 wherein the composition further comprises between about 0.5 and 10% by weight mineral oil.

16. The copper incorporated plastic composition of claim 1 wherein the amount of said primary polymer is from about 60% to about 82% by weight of the plastic composition.

17. The copper incorporated plastic composition of claim 1 wherein the amount of copper in said water-insoluble copper salt is at least about 5% by weight.

18. The copper incorporated plastic composition of claim 9 wherein said metal salt is iron oxide.

19. The copper incorporated plastic composition of claim 1, said composition being capable of formation into a container for plants, said container being capable of promoting branching of the roots of a plant planted therein.

20. A copper-incorporated plastic composition comprising:
    a polymer or blend thereof, said polymer or blend thereof comprising a primary polymer that is a good film former and that can be processed at a temperature less than about 320° F.;
    at least one absorptive material; and
    an amount of at least one water-insoluble copper salt having about 3% by weight or more, of copper, incorporated into said polymer or blend thereof;
    said composition being capable of being formed into a container.

21. A plant container, said container being formed from a plastic composition comprising:
    a polymer or blend thereof, said polymer or blend thereof comprising a primary polymer which is a good film former, which can be processed at a temperature less than about 320° F.;
    at least one absorptive material; and
    an amount of at least one water-insoluble copper salt having about 3% by weight or more, of copper, incorporated into said polymer or blend thereof;
    wherein said water-insoluble copper salt incorporated in said polymer or blend thereof becomes available to said roots when said absorptive material absorbs water, and the amount of said at least one water-insoluble copper salt incorporated in said polymer or blend thereof becomes available to said roots when said absorptive material absorbs water and the amount of said at least one water-insoluble copper salt is effective for causing the roots of a plant planted in said container to branch, upon exposure to said water-insoluble copper salt.

22. The plant container of claim 21 wherein the primary polymer readily absorbs water or is partially water soluble.

23. The plastic composition of claim 20 wherein the primary polymer readily absorbs water or is partially water soluble.

24. The plant container of claim 21 wherein the primary polymer is selected from the the group consisting of polycaprolactones and ethylene methyl acrylate.

25. The plant container of claim 21 wherein the composition further comprises a secondary polymer for the purpose of modifying the physical characteristics of the plastic composition.

26. The plant container of claim 21 wherein the composition further comprises a secondary polymer selected from the group consisting of ethylene methyl acrylate, low density polyethylene, and mixtures thereof.

27. The plant container of claim 21 wherein the composition further comprises a vegetable fiber.

28. The plant container of claim 21 wherein the water-insoluble copper salt is selected from the group consisting of copper carbonate, copper hydroxide, copper oxychloride, basic copper sulfate, cuprous oxide, and mixtures thereof.

29. The plant container of claim 21 wherein the water-insoluble copper salt is copper carbonate.

30. The plant container of claim 21 wherein the composition further comprises between about 1 and 5% by weight, as metal, of a metal salt wherein the metal is selected from the group consisting of iron, magnesium, calcium, manganese, zinc, and mixtures thereof.

31. The plant container of claim 21 wherein the absorptive material is selected from the group consisting of corn starch, potato starch, rice starch, hydroxyproplycellulose, lignosulphonates, and mixtures thereof.

32. The plant container of claim 21 wherein the absorptive material is starch.

33. The plant container of claim 21 wherein said composition further comprises between about 0.5 and 5% by weight of a surfactant selected from the group consisting of polyoxyethylene stearic acid, high molecular weight glycols polyethylene glycol, high molecular weight polypropylene glycol, poly(oxy-1,2-Ethanediyl)-α-(1-oxooctadecyl)-ω-hydroxy, and mixtures thereof.

34. The plant container of claim 33 wherein the surfactant is polyoxyethylene stearic acid.

35. The plant container of claim 21 wherein the composition further comprises between about 5 and 50% by weight of a mineral filler selected from the group consisting of talc, calcium carbonate, magnesium carbonate, mica, and mixtures thereof.

36. The plant container of claim 21 wherein the composition further comprises between about 0.5 and 10% by weight mineral oil.

37. The plant container of claim 21 wherein the amount of said primary polymer is from about 60% to about 82% by weight of said composition.

38. The plant container of claim 21 wherein the amount of said water-insoluble copper salt, as copper, is at least about 5% by weight.

39. The plant container of claim 30 wherein said metal salt is iron oxide.

40. The plant container of claim 21 wherein the absorptive material is a lignosulphonate.

41. The plant container of claim 21 wherein the absorptive material is ammonium lignosulphonate.

42. The copper-incorporated plastic composition of claim 1 wherein the absorptive material is a lignosulphonate.

43. The copper-incorporated plastic composition of claim 1 wherein the absorptive material is ammonium lignosulphonate.

44. A plant container consisting essentially of:
a plastic composition in film form comprising:
between about 20 and 85% by weight of a primary polymer that is a good film former and that can be processed at a temperature less than about 320° F.;
between about 3 and about 15% by weight, as copper, if at least one water-insoluble copper salt; and
between about 10 and 40% by weight of at least one absorptive material;
said water-insoluble copper salt being incorporated into said primary polymer.

* * * * *

UNITED STATES PATENT AND TRADEMARK OFFICE
CERTIFICATE OF CORRECTION

PATENT NO. : 6,114,431
DATED : September 5, 2000
INVENTOR(S) : Victor Lee et al.

It is certified that error appears in the above-identified patent and that said Letters Patent is hereby corrected as shown below:

<u>Column 8,</u>
Line 57, at the end of line 56, following: "copper salt; and ..." add -- between about 10 and 40% by weight of at least one absorptive material; and --.

Signed and Sealed this

Fifth Day of March, 2002

Attest:

JAMES E. ROGAN
*Attesting Officer*  *Director of the United States Patent and Trademark Office*